June 18, 1946.  L. HORNBOSTEL  2,402,224
STEAM JOINT
Filed May 12, 1944  3 Sheets-Sheet 1
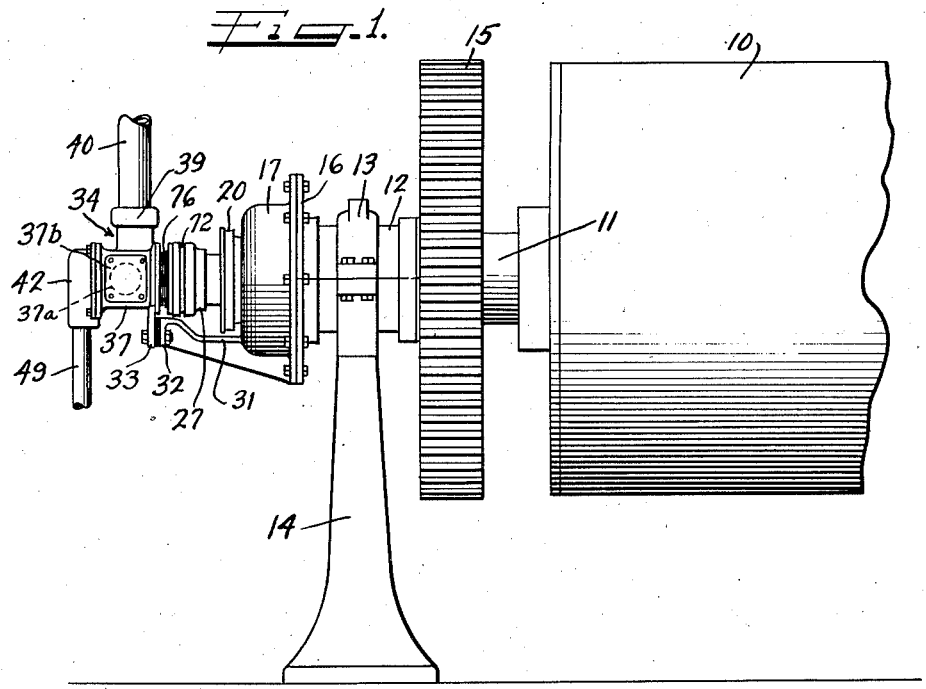
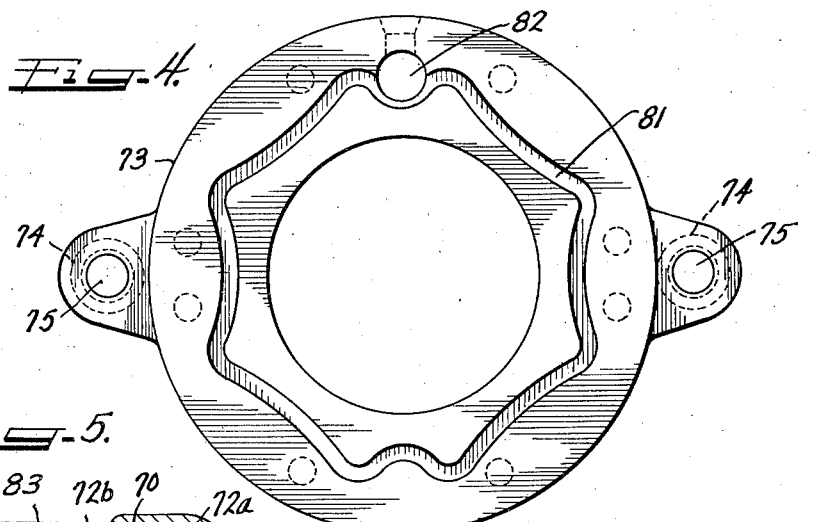
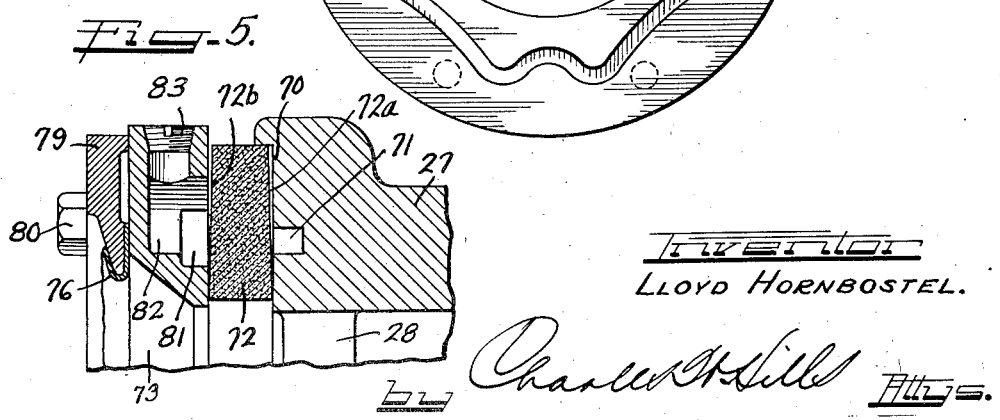
Inventor
LLOYD HORNBOSTEL.

June 18, 1946.   L. HORNBOSTEL   2,402,224
STEAM JOINT
Filed May 12, 1944   3 Sheets-Sheet 2
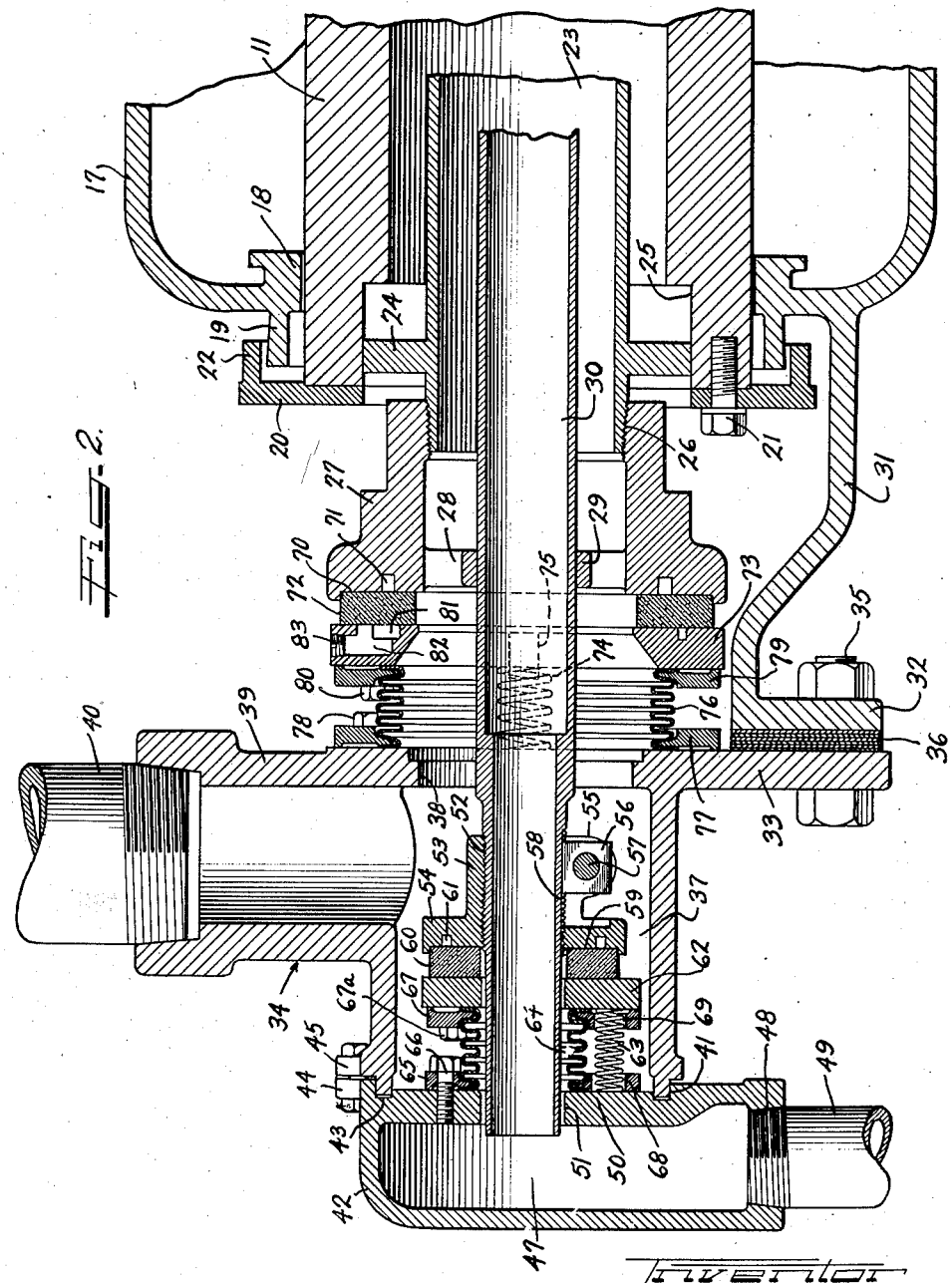
Inventor
LLOYD HORNBOSTEL.

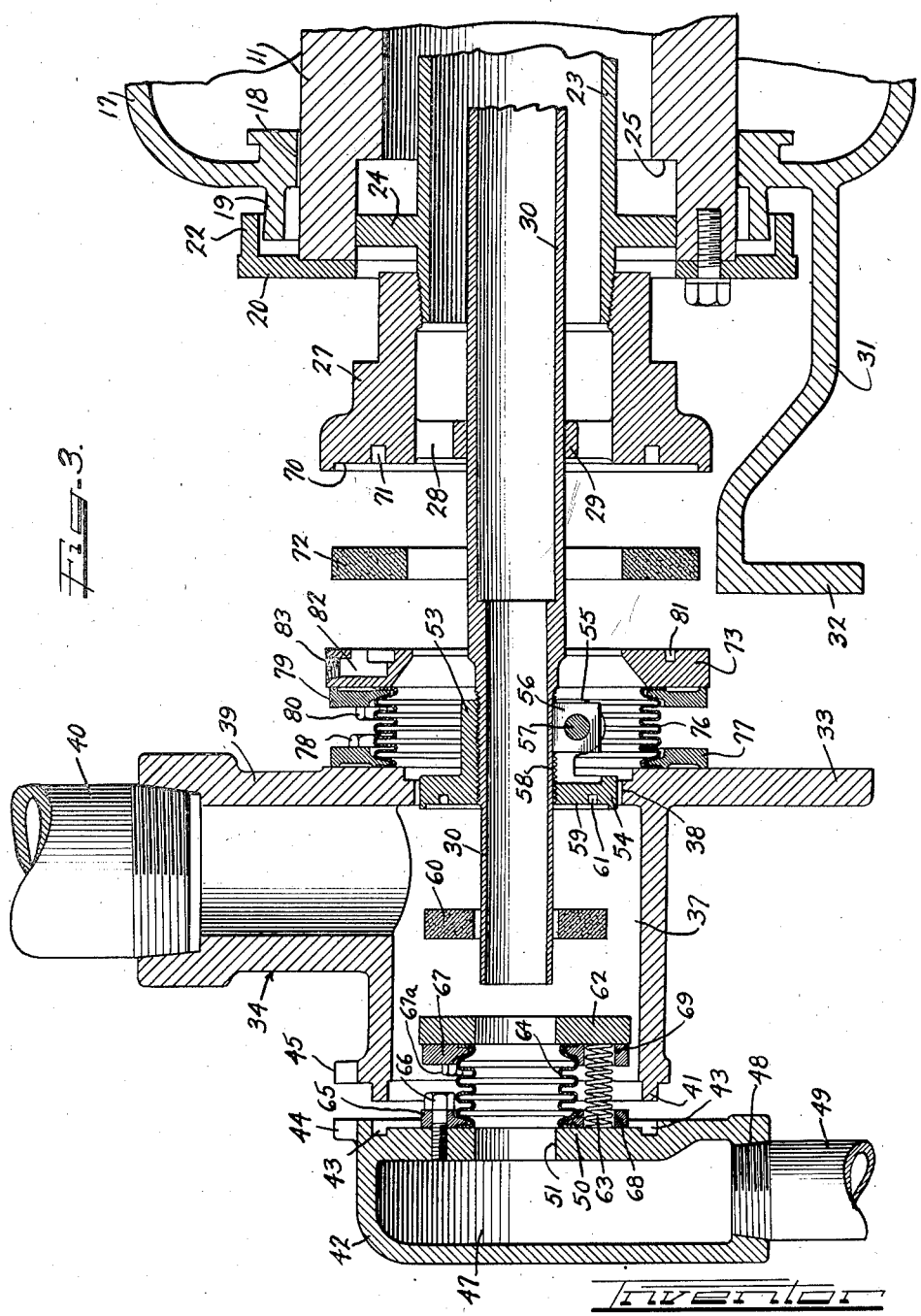

Patented June 18, 1946

2,402,224

UNITED STATES PATENT OFFICE 2,402,224

STEAM JOINT

Lloyd Hornbostel, Beloit, Wis., assignor to Beloit Iron Works, Beloit, Wis., a corporation of Wisconsin Application May 12, 1944, Serial No. 535,244

8 Claims. (Cl. 285—10)

This invention relates to a steam joint or fluid flow packing joint for rotatable drums and the like. The present improvements are especially adapted for use in connection with the rotatable drier drum of a paper making machine.

It will be understood, however, that the invention may be installed upon other types of drum structures.

The drier drum of a paper making machine is generally steam heated and rotates when operating. The steam for heating the drum is usually fed or charged thereinto by an inlet pipe extending through the hollow back or rear trunnion of the drum, and the condensate is drained from the drum through an outlet pipe that is usually telescoped by the feed pipe. If these pipes are arranged to rotate with the drum a stationary housing or coupling must be provided for connecting the pipes respectively with the source for supplying steam to the drum and with the drain or suction source which removes the condensate. To prevent leakage between the rotating pipes and the stationary coupling, seals must be provided but these seals should not interfere with free flow of steam and condensate nor should they impart appreciable friction due to rubbing between rotating and stationary parts.

Heretofore, in order to inspect or repair the sealing means of a drier drum steam joint it has been necessary to stop the entire paper machine since the drier drum had to be stationary to allow access to the interior of the housing or coupling. In addition the seals obstructed free flow of fluid and imparted material frictional resistance to rotation especially when subjected to high steam pressures.

In the present structure, however, the drum is allowed to rotate while the parts of the joint or coupling are being demounted for inspection or for repair and replacement of the sealing devices, the seals offer no flow resistance, and the seals are balanced to impart minimum resistance to rotation.

It is one of the principal objects of this invention to simplify the construction of steam joints or fluid flow packing joints for rotatable drums and to improve the efficiency, operation and dependability of such joints.

It is another principal object to provide an assembly wherein a pipe coupling is mounted in fixed relation to a rotatable drum and has sealing means associated therewith with certain parts thereof carried by the coupling housing for removal when the housing is demounted.

Another principal object thereof resides in providing a steam joint for drier drums wherein the outlet or condensate pipe extends through a housing or coupling to be received in a chambered cap that is demountable from the housing and carries parts of a separable sealing assembly to prevent leakage of the condensate being drained from the drum.

Another principal object hereof is to provide a steam joint comprising an assembly that is demountably carried upon a fixed support to receive both rotatable inlet and outlet pipes and to effect a seal between said pipes.

A still further object of this invention resides in providing a steam joint wherein provision is made for a sealed connection between the interior of the housing or coupling and the steam feed pipe that enters the drum, said housing or coupling being arranged to be bodily removed with the attached portions of the sealing means in a direction longitudinally of the axis of the pipe without stopping rotation of the drum and the pipes.

It is also an object hereof to provide a steam joint arranged to permit passage of the outlet or drain pipe through it to discharge the condensate into a cap removably closing the outer portion of the housing, said cap carrying portions of a separable seal assembly that is interposed between the cap and the outlet pipe. The arrangement permits removal of the cap to effect the demounting of the housing or coupling member.

It is also an object to provide a fluid flow packing joint for rotatable drums wherein separable chambered housings are provided with individual seals that independently connect the chambers with rotatable inlet and outlet conduits and are arranged to be replaced without stopping rotation of the drum and conduits.

A further object is to provide a steam joint for rotatable devices equipped with a balanced seal of the sliding face engagement type which is arranged so that the face pressure between the sliding parts is proportional to steam pressure.

Additional objects, aims and advantages of the invention contemplated herein will be apparent to persons skilled in the art after the construction and operation of the steam joint is understood from the within description.

It is preferred to accomplish the numerous objects of this invention and to practice the same in substantially the manner hereinafter fully described and as more particularly pointed out in the claims. Reference is now made to the accompanying drawings which form a part hereof.

In the drawings:

Figure 1 is a fragmentary side elevation of a drier drum and the rear or back end bearing structure thereof with the improved steam joint assembled therewith;

Figure 2 is an enlarged vertical section taken longitudinally of the axis of the structure showing details of the steam joint contemplated herein;

Figure 3 is a sectional view similar to Figure 2 showing the parts in exploded positions to illustrate the manner of demounting and removing the steam joint and the parts of the seal assemblies;

Figure 4 is a face view of the backing plate for the sealing device between the housing and the steam feed pipe; and Figure 5 is a fragmentary section showing the assembly of the sealing device for the steam feed pipe for the drum.

The drawings are to be understood as being more or less of a schematic character for the purpose of disclosing a typical or preferred form of the improvements that are contemplated herein, and in these drawings like reference characters identify the same parts in the different views.

In Figure 1, the numeral 10 identifies the rotatable drum, preferably the drier drum of a paper making machine, having a rear or back end trunnion 11 that is journalled in a bearing 12 mounted in an annular support 13 at the upper end of a pedestal 14. A large gear 15 is secured to the trunnion 11 for rotating the drum. The outer portion of the bearing 12 is provided with an annular flange 16 to which a bearing end cap 17 is anchored by means of bolts or the like. As seen in Figure 2, the bearing cap 17 is hollow and its outer end wall is provided with an opening 18 to receive the adjacent end of the trunnion 11 that passes through the bearing cap 17. An annular flange 19 of cylindrical shape projects outwardly from the end wall of the cap 17 around the opening 18.

A dust guard 20 is secured by bolts 21 to the transverse end face of the trunnion 11 and has a cylindrical flange 22 projecting towards the bearing cap 17 outside and surrounding the flange 19 of the end cap 17 in the manner shown in detail in Figure 2.

The drum 10 is charged with live steam through an inlet or feed pipe 23 that extends through the hollow trunnion 11 and is arranged with its inner end inside the drum. The outer end of the steam feed pipe 23 has an annular flange 24 that is fitted into and secured in a shouldered portion 25 of the bore of the trunnion 11. The pipe 23 is provided with exterior threads 26 at its outer end.

A hollow neck member 27 has a portion of its bore threaded and screwed upon the threaded end portion 26 of the steam feed pipe 23. The portion of the bore in the neck 27 that is remote to the pipe 23 is provided with a spider 28, the central hollow hub 29 of which surrounds and has the outlet pipe 30 secured to it. This outlet pipe 30 is telescoped by the steam feed pipe 23 and its inner end extends into the drum 10 for the purpose of removing condensate therefrom. The outer end of this pipe projects a considerable distance beyond the end of the steam feed pipe 23 as shown in Figures 2 and 3.

The bearing end cap 17 is provided with a bracket 31 the outer end of which is provided with a down-turned flange 32 to receive the mounting flange 33 at the lower portion of the flat rear wall of a housing or coupling member designated generally by the numeral 34. The housing or coupling member 34 is demountably anchored to the flange 32 by bolts and nuts 35, and shims 36 are interposed between the bracket flange 32 and the housing flange 33 to properly space and position the flat face of the housing or coupling with respect to the outer face of the neck member 27 on the feed pipe 23.

The housing 34 has a cylindrical chamber portion 37 that is disposed in axial alignment with the pipes 23 and 30, and an access opening 37a is made in a side wall of this chamber that is closed by a removable plate 37b secured in place by bolts or otherwise. There is an opening 38 in the flat wall of the housing above the mounting flange 33, which opening 38 is at the inner end of the cylindrical chamber portion 37 and is aligned with the pipes 23 and 30. The opening 38 is part of a conduit, later to be described, that establishes communication between the chamber portion 37 of the housing and the feed pipe 23. A steam inlet stub 39 projects upwardly from the cylindrical chamber 37 and has a portion of its bore threaded to receive the threaded end of a pipe 40 that leads to any suitable source of steam supply.

The outer end portion of the cylindrical chamber 37 is open and the end of its wall is shouldered as at 41 to receive the adjacent portion of a closure cap 42 that has an annular groove 43 into which the shouldered portion 41 is fitted. The proximate portions of the cap and the housing are provided with a plurality of lugs or ears 44 and 45 through which bolts 46 are passed to clamp the parts together.

The cap 42 is hollow to provide an internal chamber 47 and its lower portion is provided with an outlet or drain opening 48 that is threaded to receive the threaded portion of a suction pipe or drain pipe 49 that is screwed thereinto. The wall 50 of the cap which is next to the housing or coupling 34 is preferably flat and it is provided with a central opening 51 into which the adjacent end of the drain pipe or outlet pipe 30 projects in the manner shown in Figure 2. There is sufficient clearance between the pipe 30 and the wall of the aperture 51 to permit the pipe to rotate free of the cap wall 50.

Sealing means are provided between the end portion of outlet pipe 30 and the cap 42 to prevent escape of steam out of the cylindrical housing chamber 37 through the clearance between the pipe and cap wall 50. The pipe 30 is slightly reduced and threaded as at 52 to receive the hub portion 53 of a seal supporting disk 54. The hub 53 is provided with spaced opposed ears 55 between which is positioned a rectangular key block 56 held in place by means of a clamping bolt 57 that passes through said block and the ears 55. One of the edges of the key block 56 is seated in a key-way 58 cut longitudinally in the pipe through the threads 52, thus locking the seal supporting disk 50 on the pipe to prevent movement thereof independent of the pipe 30 while permitting the disk 54 to rotate with said pipe. The outer face of the disk 54 is provided with a depression or recess 59 to seat the seal ring 60 that is preferably a carbon block of annular form. The depression or recess 59 of the disk 54 is provided with an irregular or circuitous channel 61 that provides a means for distributing lubrication upon the relatively movable parts.

The seal ring block 60 is opposed on its side opposite the disk 54 by a backing plate or follower 62 freely surrounding the adjacent portion of the pipe 30. The follower or backing plate 62 is yieldably urged toward the seal ring 60 by means of a plurality of coiled springs 63 that are interposed between the follower plate 62 and the flat wall 50 of the cap member 42. The disk 54 acts as an abutment toward and against which the parts are pressed in effecting the seal.

A yieldable bellows 64 surrounding the pipe 30 also is interposed between the flat wall 50 of the cap and the backing plate or follower 62. This bellows 64 is open at both ends to accommodate the pipe 30 therethrough. The outer end of the bellows is securely anchored in place against the cap flat wall 50 by a split clamping ring 65 that is held in place by bolts 66 inserted therethrough and screwed into threaded recesses in the cap wall 50. The other end of bellows 64 is firmly held against the follower plate 62 by a split clamping ring 67 that is anchored in place by bolts 67a that pass through the clamp ring and are screwed into the backing plate or follower 62. As seen in Figure 2, the clamp rings are provided with recesses or apertures 68 and 69 respectively that are arranged in aligned pairs and provide seats or sockets for the adjacent ends of the springs 63 that urge the backing plate or follower 62 toward the seal ring 60. The clamping rings 65 and 67 being of the split type facilitate ready assembly with the respective ends of the bellows 64.

The arrangement above described provides a dependable seal between the stationary cap 42 and the rotatable outlet pipe 30 and it effectively prevents escape of steam from the chamber 37 of the housing through opening 51 into the chamber 47 of the cap. Also, as shown in Figure 3, the cap 42 may be readily demounted from the housing 34 while the outlet pipe 30 is rotating with the drum merely by removing the bolts 46 that clamp the cap 42 to the housing 34. The bellows 64 together with the backing plate or follower 62 which comprise the portion of the sealing assembly mounted on the cap wall 50 are arranged in telescopic relation to the pipe 30 and are taken out when the cap 42 is demounted from the housing 34 by moving the cap and the seal parts in a direction longitudinally of the axis of the pipe 30. Thereafter this seal ring 60 may be slipped off the end of the pipe 30 in the manner suggested in Figure 3.

Sealing means are also provided between the housing 34 and the neck 27 of the inlet pipe 23. The flat disk-like face of the neck 27 is provided with a depression or recess 70 in which there is a circuitous lubricating channel 71. A carbon seal ring 72 is removably seated in the recess 70 of the neck piece as shown in Figure 2 and said ring is opposed by a backing plate or follower ring 73. This follower ring 73 is urged toward the seal ring 72 by a plurality of coil springs 74 seated around studs 75 projecting from the follower ring 73, the other ends of the springs 74 pressing against the flat wall of the housing or coupling 34. One end of a bellows 76 is firmly held against the flat wall 39 by a split clamping ring 77 that is secured in position by bolts 78 that pass through the ring and are threaded into the flat wall of the housing. The other end of the bellows is securely attached to the backing ring or follower 73 by a split clamping ring 79 that is anchored in place by bolts 80 that pass through the clamping ring 79 and are threaded into the backing ring or follower 73.

An irregularly shaped channel or groove 81 best shown in Figure 4 is formed in the face of the backing ring or follower 73 that opposes the seal ring 72. The upper portion of this channel communicates with an oil well 82 that opens to the upper segment of the follower ring 73 and is closed by a plug 83. Oil from the groove 81 will impregnate the carbon seal.

The shims 36 which are interposed between the flange 33 of the housing 34 and the bracket flange 32 are adapted to position the housing flat wall in proper relationship and correctly spaced from the neck member 27 on the inlet pipe 23.

As will be seen in Figure 3, the opening 38 in the flat wall of the housing 34 is of sufficient diameter to permit the longitudinal removal of the housing with respect to the outlet pipe 30 when the housing is being demounted. Also, the parts of this seal assembly are arranged in telescopic relation to the pipe 30 and the abutment or seal disk 34 thereon. The internal diameter of the backing ring or follower 73 and the sealing ring 72 are sufficiently larger than the diameter of the sealing disk 54 to permit withdrawal of these parts when the housing is being dismounted and removed.

The opening 38 in the flat wall of the housing, together with the bellows 76, the follower ring 73, the seal ring 72 of the bore of the neck member 27 provide the walls of a conduit or passageway that establishes communication between the cylindrical chamber 37 of the housing 34 and the outer end of the inlet pipe 23. This conduit or passageway is closed, being sealed against the escape of steam to the atmosphere by the seal assembly that is interposed between the neck member 27 and the housing flat wall and being further sealed against escape of steam to the drain pipe 49 by the seal assembly interposed between disk 54 and wall 50 of the cap 42.

The seal arrangement permits rotation of the pipes 23 and 30 with the drum 10 while the housing 34 and its cap 42 will remain in fixed position. The carbon seal ring 72 has tapered active faces 72a and 72b as shown in Figure 5 so that these faces will quickly wear into good sealing engagement with the disk face of the neck 27 and the face of the follower ring 73 even though the parts be misaligned. Thus initial ring line contacts will be established between the carbon faces and its cooperating face parts and these lines will soon wear into substantial area contacts.

As steam pressure in the housing 35 increases sealing becomes more difficult but the seals of this invention are arranged so that increased pressures will expand the bellows causing the followers to press the carbon rings tighter thereby increasing the sealing pressures and making the seals more efficient but also adding frictional resistance to rotation. This arrangement makes possible maintenance of minimum friction resistance consistent with good sealing properties. The seal is therefore "balanced" with respect to sealing capacity and friction resistance.

The cap 42 and the portion of the seal assembly which is carried thereby may be readily removed in a longitudinally axial direction merely by removing the bolts 46 which clamp the cap to the housing 34 and then moving the cap and its assembled seal parts longitudinally out of their operating position. After this has been done the housing 34 may be demounted from the bracket 31 and when being removed it will carry with it the portions of the sealing assembly that are mounted on said housing 34. The arrangement provides a fluid flow packing or steam joint having separable chambers each having its individual seal between it and a respective rotatable fluid conduit, whereby the seals together with the chambers may be demounted while the conduits continue their rotative movement and without stopping the operation of the machine upon which this arrangement is installed.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. A fluid flow packing joint for rotatable drier drums and the like having telescoped inlet and outlet pipes rotatable with the drum and extending through a rotatable trunnion and bearing thereof, which comprises a housing supported in stationary demountable relation to the trunnion bearing, a second housing removably supported by the stationary housing, a conduit connected with each housing, each housing having a chamber, a seal including a bellows connecting the chamber of the first housing with the inlet pipe, and another seal including a bellows connecting the chamber of the second housing with the outlet pipe, said seals each being arranged separately for replacement upon disconnection of its associated housing from the support of that housing without stopping rotation of the drum and pipes.

2. A steam joint for a rotatable drum having telescoped rotatable inner and outer pipes leading thereinto through a rotatable trunnion thereof, comprising a stationary housing supported independently of said pipes and having an open ended chamber receiving the inner pipe through an end thereof, a hollow cap receiving the end of the inner pipe and closing the other end of the chamber, sealing means between the outer pipe and housing, and other sealing means between the inner pipe and cap, said sealing means each including annular bellows members disposed in telescopic relation to the inner pipe and adapted for bodily removal respectively with said housing and cap in a direction longitudinally of the inner pipe.

3. A steam joint for a rotatable drum having telescoped rotatable inner and outer pipes leading thereinto and a trunnion bearing having a stationary end member, comprising a stationary housing demountably carried by the bearing end member and having an open ended chamber receiving the inner pipe through an end thereof, a chambered cap receiving the end of the inner pipe and removably mounted on the housing to close the other end of the housing chamber, said inner pipe rotating out of contact with said housing and cap, and seals individually supported by said housing and cap for independently connecting the chambers of the housing and cap with the respective outer and inner rotatable pipes, said seals each including annular bellows members disposed in telescopic relation to the inner pipe and adapted to be separately removed with said housing and cap.

4. A steam joint for a drum having a rotatable hollow trunnion and a fixed bearing therefor, comprising telescoped pipes disposed in the trunnion to rotate therewith, said pipes defining an outer feed passage and an inner discharge passage communicating at their inner ends with the drum, a hollow casing removably carried by the fixed bearing in spaced relation to the outer end of the outer pipe, the casing having an open ended passageway through which the inner pipe freely projects, a removable hollow apertured cap freely receiving the projecting portion of the inner pipe, said cap closing the adjacent end of the casing passageway and being detachably mounted on said casing, opposing separable means carried respectively by the outer pipe and the casing to seal the space therebetween and establish communication between the casing passageway and the outer pipe, and opposing separable devices effecting a seal between the inner pipe and the removable cap, one of said devices carried by the inner pipe and another of said devices carried by and removable with said cap.

5. A steam joint for a rotatable drum having telescoped rotatable inlet and outlet pipes extending through a rotatable hollow trunnion thereof and having a fixed bearing for the trunnion, comprising a removable hollow casing supported by the fixed bearing having an open ended chamber one end of which is adapted for communication with said inlet pipe, a removable hollow cap closing the other open end of the casing chamber, means for supplying steam to the chamber, the outlet pipe extended freely through the casing chamber to discharge into said cap, an annular flange carried by and rotatable with the inlet pipe adjacent said casing, a seal ring opposing said flange, a bellows between said seal ring and casing for closing the space therebetween, said bellows being carried by said casing around the end of the chamber that communicates with said feed pipe and being adapted for removal integrally with said casing, an annular stop carried by the outlet pipe within the casing chamber adjacent the hollow cap, a seal ring opposing said stop, and a bellows around said outlet pipe between the stop thereon and the cap for closing the space therebetween, said bellows being carried by said cap for removal integrally therewith from said casing.

6. A steam joint for a drum having a rotatable hollow trunnion and a fixed bearing for said trunnion, comprising a steam feed pipe rotatable with and extending into the trunnion to supply steam to the drum, a removable hollow casing supported by the fixed bearing having a passageway that is open at its ends, one end of said passageway communicating with said feed pipe, a removable hollow cap detachably supported on the casing closing the other epon end of the casing passageway, means for supplying steam to the casing passageway, a fluid removal conduit within and rotatable with said feed pipe, the inner end of said conduit extended into the drum and the other end extended freely through the casing passageway and discharging into said cap, an annular flange carried by and rotatable with said feed pipe adjacent said casing, a seal ring opposing said flange, a bellows between said seal ring and casing for closing the space therebetween, said bellows being carried by said casing around the end of the passageway that communicates with said feed pipe for removal with said casing, an annular stop carried by said conduit in the casing passageway adjacent the hollow cap, a seal ring opposing said stop, and a bellows around said conduit between the stop thereon and the cap for closing the space therebetween, said bellows being carried by said cap for removal therewith from said casing.

7. A steam joint for rotatable drums and the like having telescoped inlet and outlet pipes extending through a rotatable hollow trunnion thereof and a fixed bearing member for said trunnion, which comprises a stationary housing demountably carried by the fixed bearing member and defining an open ended chamber receiving the outlet pipe through an end thereof, a chambered cap receiving the end of the outlet pipe and removably mounted on the housing to close the other end of the housing chamber, means for supplying steam to the housing chamber, a seal connecting the housing chamber to the rotatable inlet pipe comprising an annular flange carried by and rotatable with the inlet pipe adjacent said housing, a seal ring opposing said flange, a bellows between said seal ring and housing for closing the space therebetween, said bellows being carried by said housing around the open end of the chamber adjacent the inlet pipe and adapted for removal with said housing, and a seal connecting the cap chamber to the rotatable outlet pipe comprising an annular stop carried by the outlet pipe in the housing chamber adjacent the cap, a seal ring opposing said stop, and a bellows around said outlet pipe between the stop thereon and the cap for closing the space therebetween, said bellows being carried by said cap for removal therewith from said housing.

8. A fluid flow joint for a rotatable drum bearing assembly having a rotatable trunnion extending beyond a stationary bearing therefor and having telescoped rotatable conduits extending from the rotatable drum trunnion, comprising a stationary housing having an open-ended chamber receiving the inner conduit freely through one end thereof, a fluid pipe connected with said housing in communication with said chamber, means for detachably supporting said housing on said bearing at a fixed distance from the end of said outer conduit, a hollow cap detachably mounted at the other end of said housing for closing the latter end, a fluid pipe connected with said cap, the inner conduit rotating free of said cap, a sealing member carried by the inner conduit freely within said chamber, a sealing ring contacting said member, means including a bellows supported on said cap yieldably pressing said ring against said member arranged for establishing sealed communication between said inner conduit through the cap to the pipe connected thereto, a second sealing ring having sealing contact with said outer conduit, and means including a bellows supported on said housing yieldingly establishing with said second ring a sealed communication from the outer conduit through said chamber to the pipe connected therewith.

LLOYD HORNBOSTEL.